Jan. 15, 1957　　　　L. A. DOUGHTY　　　　2,777,892
CLOSURE ASSEMBLY FILLING OPENINGS OF STORAGE BATTERIES
Filed Feb. 21, 1955　　　　　　　　　　　　2 Sheets-Sheet 1
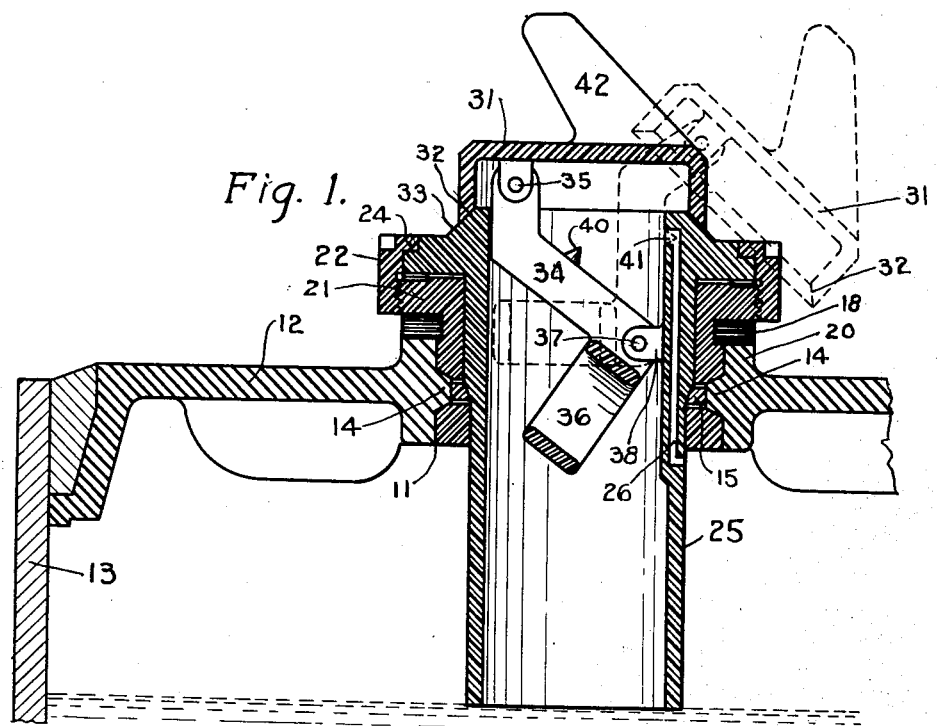
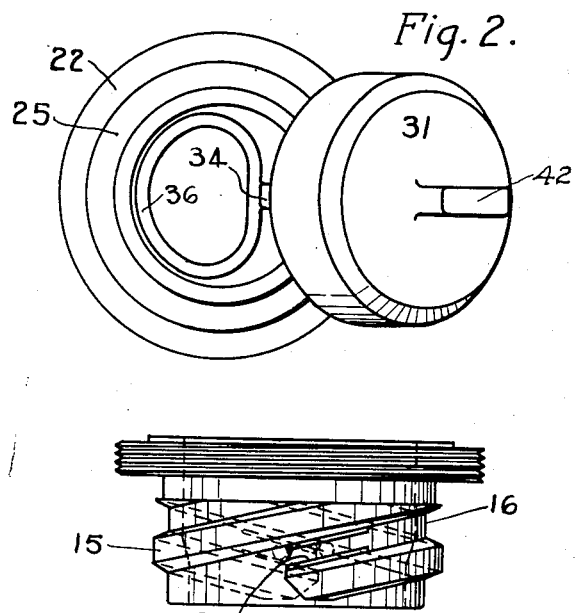
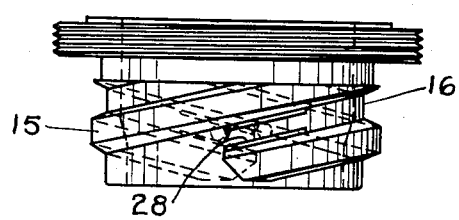
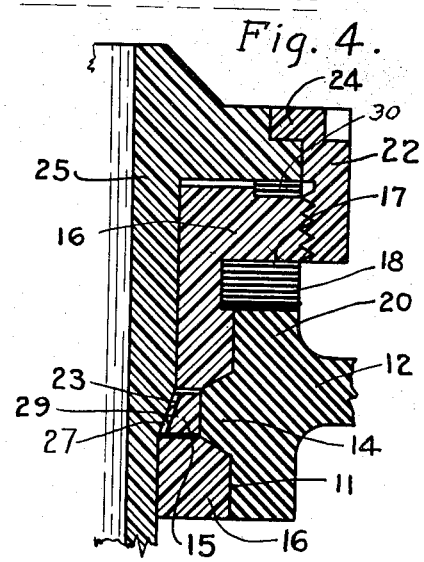
INVENTOR.
LEON A. DOUGHTY
BY
Robert M. Barr Jan. 15, 1957   L. A. DOUGHTY   2,777,892
CLOSURE ASSEMBLY FILLING OPENINGS OF STORAGE BATTERIES
Filed Feb. 21, 1955   2 Sheets-Sheet 2

INVENTOR.
LEON A. DOUGHTY
BY
Robert M. Bass

United States Patent Office 2,777,892
Patented Jan. 15, 1957

2,777,892

CLOSURE ASSEMBLY FILLING OPENINGS OF STORAGE BATTERIES

Leon A. Doughty, Glenside, Pa., assignor to C & D Batteries, Inc., Conshohocken, Pa., a corporation of Pennsylvania Application February 21, 1955, Serial No. 489,379

8 Claims. (Cl. 136—170)

The present invention relates to storage batteries and more particularly to a novel closure assembly for the filling opening of such a battery as an improvement on applicant's Patent No. 2,506,952.

While the closure of the invention is for use generally with storage batteries it is more specifically designed for use in a storage battery which is an associated part of an air conditioning system of a railroad car.

Such batteries are arranged in multiple units housed in a closed casing having a side door for access so that an attendant can check the batteries as required. In some instances the batteries are arranged paralled to the length of the casing, and in other instances are transverse of the length, but in either position are so inaccessible that an attendant has trouble removing and replacing the plugs each time a battery has to be tested or has its level replenished. Furthermore, in many instances the plugs are carelessly misplaced and the opening not closed at all. Also such plugs tend to work loose due to vibration of the train and leave the filling openings exposed so that the circulated cooling air passing through the casing carries in cinders and dirt to enter either the exposed opening or by way of the plug vents when the latter are in place.

An object of the present invention is to provide an improved closure assembly for a storage battery.

Another object is to provide a closure as a permanently attached part of a storage battery, whereby it is possible to test the battery, inspect the liquid level and replenish the liquid therein without the danger of losing the cap or failing to replace it.

Another object is to provide a closure for the filling opening of a storage battery wherein provision is made for selectively setting the closure according to the position of the battery in order to give the most efficient access to the opening.

A further object is to provide a novel leak-proof interlock between a closure and the cover of the battery.

A still further object is to provide a self closing cap for the filling opening of a storage battery; and to provide other improvements as will hereinafter appear.

Figure 5:
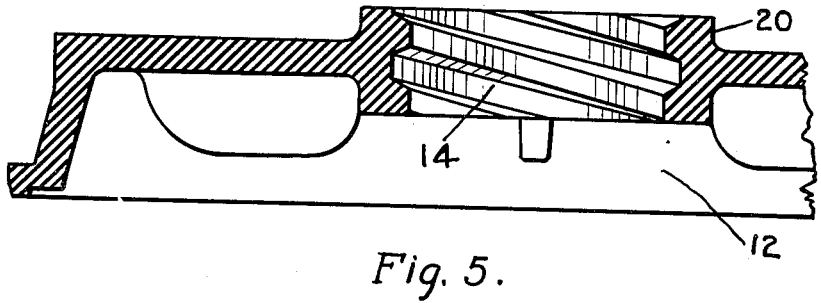
Figure 6:
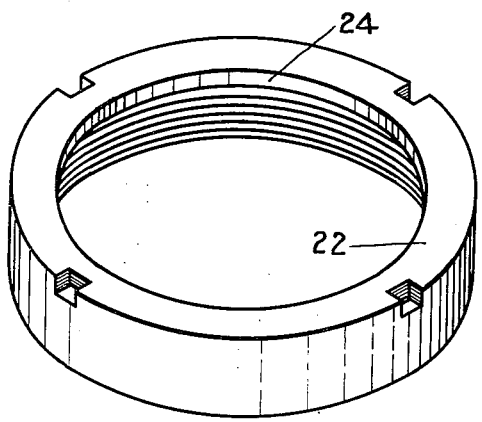
Figure 8:
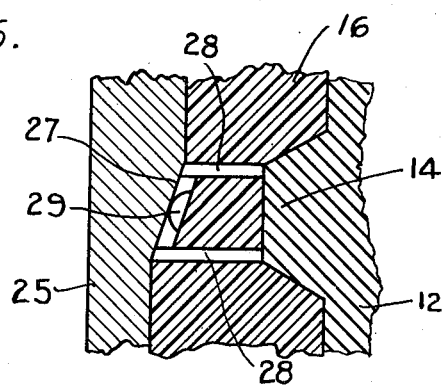
Figure 7:
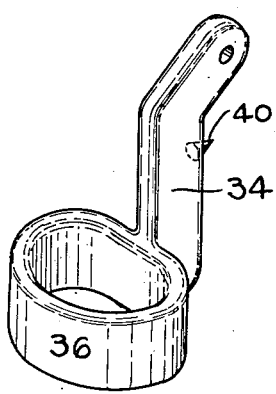

In the accompanying drawings, Figure 1 represents a fragmentary sectional elevation of a storage battery showing one form of closure assembly of the invention assembled in the filling opening of the cover of a battery; Figure 2 represents a plan of the same showing the closure in open position; Figure 3 represents a side elevation of the retaining collar for association with the battery cover; Figure 4 represents an enlarged sectional detail of the thread binding means; Figure 5 represents a fragmentary sectional elevation of the cover showing the threaded filling opening to receive the retaining collar; Figure 6 represents a perspective of the clamping ring for holding the filling tube in place and anchoring the retaining ring in leak-proof relation; Figure 7 represents a perspective of the closure controlling lever and counterweight; and Figure 8 represents a sectional detail of the slit thread and its expanding means on an enlarged scale.

Referring to the drawings, one form of the invention is shown as assembled in operative condition as a closure for the filling opening 11, in the cover 12, of the case 13 of a storage battery. The opening 11 is provided with internal threads 14 of proper pitch for quick assembly with the external threads 15 of a retaining collar 16 having a circumferential groove 17 to receive a gasket 18, which in assembled position seats upon the annular rim 20 of the filling opening 11. The outer end of the collar 16 terminates in a circumferential flange 21 to seat upon the gasket 18, said flange 21 being externally threaded to co-act with a clamping ring 22 for compressing the gasket to form a leak-proof joint. Adjacent its lower end the collar 16 is internally reduced in diameter to provide a bevelled shoulder 23 in the plane of the threads 14. The ring 22 is formed with an internal flange 24 overlying the top of the supporting head of a filling tube 25 which passes through the collar 16 with a turnable fit and terminates at or just below the normal level of the electrolyte in the battery cell. A vertically disposed vent passage 26 is provided in the wall of the tube 25 to communicate at its lower end with the gas space above the cell plates, so that when the passage 26 is open with the closure 31 closed the cell is vented but when the passage 26 is closed by the plug valve 40 with the closure 31 open the air pressure is built up in the cell by the adding of water and no more water can enter the cell than the weight of water in the tube 25. In other words the trapped air pressure balances the weight of the column of water.

In order to provide an effective seal between the meshing threads of the cover 12 and the collar 16 the lower end portion of the tube 25 is externally reduced in diameter to form a circumferential bevel 27 for contacting the shoulder 23 of the collar when the tube is drawn down to its clamped position by the ring 22 and thus exert radial pressure back of the collar thread. As a means to ensure this radial expansion or deforming, the thread 15 is formed with two lengthwise slits 28 at opposite edges and an internal projection 29 in the downward path of movement of the tube bevel 27. Preferably the threads 15 are slitted at diametrically opposite points for maximum efficiency. Thus in assembling the parts in the filling opening 11, the collar 16 is fed into place by the meshing cover threads to seat upon the gasket 18. The tube 25 is now inserted through the collar with its flanged head in position to seat upon the packing 30, while the bevel 27 is ready to engage the collar shoulder and projection 29. When the clamping ring 22 is screwed into place the tube 25 in its downward movement acts as a wedge against the thread projection so that the slit portion of the thread 15 is pressed into binding contact with the opposed cover thread 14. Preferably the parts are formed of plastic or ductile material suitable for the explained deforming action of the thread.

For closing, and for also gaining access, to the tube 25, a cap shaped closure 31, is provided to seat over the exposed end of the tube 25, where its annular contact face 32 is bevelled to seat upon a complemental bevel 33 encircling the upper marginal rim of the tube 25. Such bevel faced construction effectively seals the tube from cinders and dirt. The cap closure 31 is attached and controlled by a lever, here shown as in the form of a bell-crank shaped counter-weight, one leg 34 of which is pivotally connected to the closure 31 by a pin 35, while at the junction with the leg 36 it is pivoted by a pin 37 traversing a lug 38 provided internally of the wall of the tube 25. The leg 36 is preferably in the form of a ring arranged concentrically in the tube 25 for free swinging movement and since it swings eccentric to the axis of the tube it is scarfed marginally along its lower rim in order to avoid contact with the wall of the tube during its movement. The leg 36 is of the proper thickness for sensitive overbalance of the closure for certain closing of the latter when released. By providing a ring shaped counter-weight the opening there through is substantially coaxial of the tube when the closure is open so that the filling opening is entirely accessible for the insertion of a hydrometer or for replenishing.

In order to prevent the escape of air or gas by way of the vent passage 26 when the closure is open and more particularly to trap such air or gas in the cell at that time, the counter-weight leg 34 is provided with a laterally projecting needle valve 40 so radially spaced from the pivot pin 37 to ride into a valve seat 41 at the discharge end of the vent passage 26 when the cap closure is swung to open position. By so closing the vent, the space above the cell plates is held under pressure during a filling operation and thus indicates the correct level when the liquid closes the lower end of the tube 25.

The closure 31 is provided with an outwardly projection extension 42 for opening purposes, which according to present day practice is done by the use of a tool to lift and hold the closure open while introducing water. Some such tools are formed as an attached part of the hose used in replenishing. Since the closure 31 can be turned to any selected position in the three hundred and sixty degree circumferential, the initial setting of the closure is such as to locate the extension 42 in the proper position to be pushed open by the tool.

As a further explanation of the functioning of the vent passage 26 and the relation of the tube 25 to the level of the electrolyte, it will be seen that when the closure is open the needle valve 40 closes the passage 26 so no venting of the cell can take place. Now water can be added and as the level rises it builds air pressure in the cell equal to the weight of water in the tube 25 and since the lower end of the tube is submerged this pressure presents any more water entering the cell and so automatically maintains the proper liquid level.

Having now described my invention, I claim:

1. A storage battery comprising a cover having an internally threaded filling opening, a collar threaded into said collar, a filling tube traversing said collar, a closure pivoted upon said tube to swing about a horizontal axis, said closure and tube being turnable about a vertical axis, and means including a radially expansible portion of the collar thread for locking said tube with said closure in a selected rotated closed position.

2. A storage battery according to claim 1, wherein said locking means includes a circumferential bevel on said tube and a slitted portion of a collar thread in the path of said bevel, and means to force said tube downward to expand said collar portion against a cover thread to prevent relative turning.

3. A storage battery comprising a cover having an internally threaded filling opening, a collar threaded into said opening, a filling tube traversing said collar, a closure pivoted upon said tube to swing about a horizontal axis, a counter-weight biasing said closure to closed position said counter-weight forming one leg of a bell crank, said bell crank being pivoted in said tube as a hinge for said closure and the other leg of the bell crank being pivoted to said closure.

4. In a storage battery, the combination of an internally threaded filling opening, a collar threaded into said opening, a filling tube traversing said collar to terminate within the battery, said tube having a vent passage with an inlet in the battery space and an outlet into said tube, said outlet forming a valve seat, a closure for the projecting end of said tube, a counter-weighted lever mounting said closure to swing about a horizontal axis and biasing said closure to closed position, and a needle valve on said lever arranged to enter said seat when the closure is open.

5. In a storage battery according to claim 4, wherein said lever carries an annular counter-weight.

6. A storage battery comprising a cover having an internally threaded filling opening, a collar threaded into said opening, said collar having a split section radially distortable against the wall of said opening, a filling tube traversing said collar having an external, downwardly disposed circumferential bevel, a closure carried by said tube, said collar section having a projection in the axial path of movement of said bevel to be forced radially outward by the insertion of said tube to lock said tube in a selected rotated position, and a clamping ring holding said tube against axial movement.

7. A storage battery according to claim 6 wherein a sealing gasket is disposed between said collar and said cover.

8. A storage battery according to claim 7 wherein a sealing gasket is disposed between said ring and said collar.

References Cited in the file of this patent
UNITED STATES PATENTS

| | | |
|---|---|---|
| 2,506,952 | Doughty | May 9, 1950 |
| 2,673,231 | Kennedy | Mar. 23, 1954 |